(12) United States Patent
Chevion et al.

(10) Patent No.: US 8,326,542 B2
(45) Date of Patent: Dec. 4, 2012

(54) METHOD AND SYSTEM FOR RETRIEVING SEISMIC DATA FROM A SEISMIC SECTION IN BITMAP FORMAT

(75) Inventors: Dan Shmuel Chevion, Haifa (IL); Yaacov Navon, Ein Vered (IL)

(73) Assignee: International Business Machines Corporation, Armonk, NY (US)

( * ) Notice: Subject to any disclaimer, the term of this patent is extended or adjusted under 35 U.S.C. 154(b) by 429 days.

(21) Appl. No.: 12/621,535

(22) Filed: Nov. 19, 2009

(65) Prior Publication Data
US 2011/0118984 A1  May 19, 2011

(51) Int. Cl.
*G01V 1/28* (2006.01)
(52) U.S. Cl. ............... 702/14; 702/2; 702/16; 702/17; 367/30; 367/53; 367/131; 367/135; 382/276; 382/232; 382/263; 382/264; 382/248
(58) Field of Classification Search ............... 702/2, 14, 702/16, 17; 367/30, 38, 45, 46, 57, 131, 367/135, 53; 382/276, 232, 263, 264, 248
See application file for complete search history.

(56) References Cited

U.S. PATENT DOCUMENTS

| | | | |
|---|---|---|---|
| 4,853,903 A * | 8/1989 | Linville et al. .................. | 367/46 |
| 4,926,394 A | 5/1990 | Doyen | |
| 5,060,202 A * | 10/1991 | Meek et al. ..................... | 367/45 |
| 5,175,710 A * | 12/1992 | Hutson .......................... | 367/135 |
| 5,237,538 A * | 8/1993 | Linville et al. .................. | 367/38 |
| 5,287,328 A * | 2/1994 | Anderson et al. ............... | 367/38 |
| 5,502,688 A * | 3/1996 | Recchione et al. ............. | 367/131 |
| 6,084,825 A * | 7/2000 | Poggiagliolmi ................ | 367/30 |
| 6,438,493 B1 | 8/2002 | West et al. | |
| 6,493,636 B1 * | 12/2002 | DeKok ............................ | 702/17 |
| 6,501,703 B2 * | 12/2002 | Zhou et al. ...................... | 367/38 |
| 6,912,466 B1 | 6/2005 | Gao | |
| 7,013,218 B2 * | 3/2006 | Baker et al. ..................... | 702/16 |
| 7,272,265 B2 * | 9/2007 | Kouri et al. .................... | 382/260 |
| 7,277,523 B2 | 10/2007 | Mattson | |
| 7,355,923 B2 * | 4/2008 | Reshef et al. ................... | 367/53 |
| 8,022,947 B2 * | 9/2011 | Wei et al. ...................... | 345/419 |
| 2004/0071363 A1 * | 4/2004 | Kouri et al. .................... | 382/276 |
| 2005/0027452 A1 * | 2/2005 | Baker et al. ..................... | 702/14 |
| 2006/0247858 A1 * | 11/2006 | Cacas ................................ | 702/2 |
| 2008/0059074 A1 * | 3/2008 | Wei et al. ....................... | 702/16 |
| 2010/0161232 A1 * | 6/2010 | Chen et al. ...................... | 702/16 |
| 2011/0125014 A1 * | 5/2011 | Derode et al. ................ | 600/437 |
| 2011/0130967 A1 * | 6/2011 | Bakulin et al. ................. | 702/16 |
| 2012/0038642 A1 * | 2/2012 | Wei et al. ....................... | 345/424 |

OTHER PUBLICATIONS

Luca Gasperini, Giuseppe Stanghellini, "An interactive computer program for processing and interpretation of high-resolution seismic reflection profiles", Istituto di Scienze Marine, Geologia Marina, CNR, Bologna, Italy, Computers & Geosciences, vol. 35, Issue 7, Jul. 2009 pp. 1497-1507.

(Continued)

*Primary Examiner* — Carol Tsai (57) ABSTRACT

A computer implemented method for retrieving seismic data from a seismic section provided in a bitmap format. The method includes reconstructing a two dimensional matrix of seismic interpolated data in which a value at a given pixel in the matrix is proportional to local density of wiggles in the seismic section with an added value of a previously calculated pixel. The method may be implemented in either of computer hardware configured to perform said method and computer software embodied in a non-transitory, tangible, computer-readable storage medium. Also disclosed are corresponding computer program product and data processing system.

21 Claims, 8 Drawing Sheets

OTHER PUBLICATIONS

I. Pitas, C. Kotropoulos, "A texture-based approach to the segmentation of seismic images", Department of Electrical Engineering, University of Thessaloniki, Thessaloniki 54006, Greece, Pattern Recognition, vol. 25, Issue 9, Sep. 1992, pp. 929-945.

* cited by examiner

METHOD AND SYSTEM FOR RETRIEVING SEISMIC DATA FROM A SEISMIC SECTION IN BITMAP FORMAT

BACKGROUND

The present invention relates to seismic data. More specifically the present invention relates to retrieving seismic data from a seismic section provided in the form of a scanned seismic profile in a binary image format (bitmap).

Seismic data has been collected for several decades and a vast part of the older seismic data is only available in paper format of seismic sections. According to conservative estimates there are several millions of paper seismic sections owned by oil companies and similar institutions, the value of which is huge and sometimes immeasurable, especially when surveys are no longer possible in certain areas.

With the introduction of modern seismic workstations and user friendly interpretation software, most of these paper seismic sections have become useless, unless they can be converted into digital format (e.g., into standard SEG-Y format). In current conversion technology, the conversion process is slow, due to large amount of manual intervention, and involves relatively high costs and long throughput times. The slow process and the high costs discourage many oil companies from converting the legacy paper seismic sections into SEG-Y. The conversion is currently done on a project by project basis, driven by opportunity or to fulfill legal obligations.

A seismic section typically includes seismic traces, which represent the responses of the elastic wavefield to the density of earth layers and acoustic velocity across these layers as acoustic energy travels from a source through these layers to one or more receivers. A seismic section paper is typically a large sheet of about 2-3 meters by 1 meter. It is composed of two main parts: metadata and traces. The metadata is a graphical and a textual data describing mainly acquisition parameters. The traces area, which is the largest part, is composed of a large series of a traces plotted one next to the other. A trace is a series of amplitudes at time steps (from top to bottom), around an imaginary base line. The traces appear as vertical wiggling lines (referred to as "wiggles"). Seismic sections sometimes include horizontal time lines (or depth lines if conversion from time to depth had been performed). In some seismic traces the positive or negative sides of the wiggles are blackened—areas to the right (for positive) or to the left (for negative) of the imaginary base line about which the line wiggles confined between the line and that base line appear as black blobs.

Figure 1:
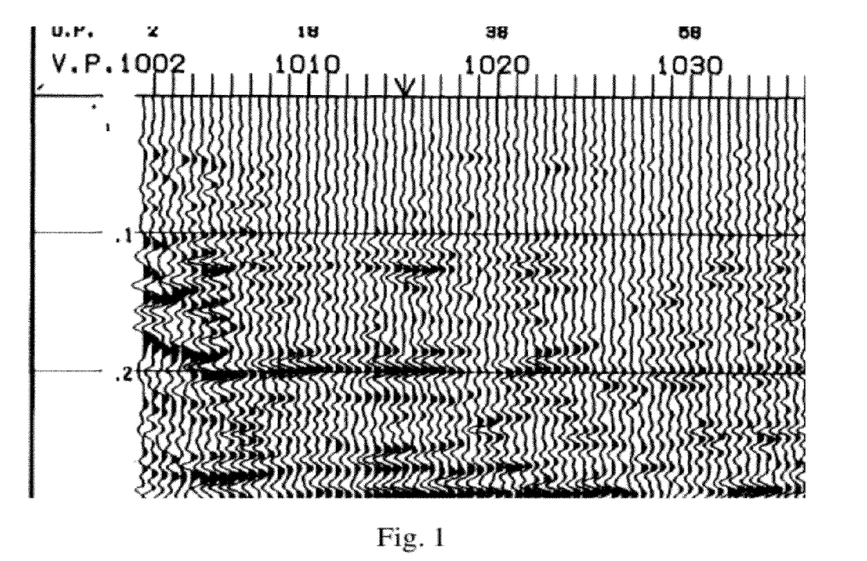
FIG. 1 is a snippet of a larger paper scanned image of a typical seismic section saved on paper or provided in the form of an image.

A snippet of a larger paper scanned image of a seismic section is shown in FIG. 1. Each vertical line represents a vertical function (and is called a wiggle). It is evident that digitizing this graphical representation is not an easy task. It is evident that the vertical lines in some cases overlap and it is hard to distinguish and determine the correct line. Furthermore, typically the right hand side of a wiggle has amplitude overlaps, which are characterized by black areas (blobs), that represent the area confined between the imaginary zero axis (also called "the base line") and the function line when the value of the line is above zero.

This makes it extremely difficult to obtain information on the positive side (or negative, depending on the "blobbed" side) of the line functions, and it is, therefore, practically impossible to follow a function line that crosses a blob.

Another problem is image quality and in particular discontinued lines (mainly associated with scan quality).

SUMMARY

According to embodiments of the present invention there is provided a computer implemented method for retrieving seismic data from a seismic section provided in a bitmap format. The method includes reconstructing a two dimensional matrix of seismic interpolated data in which a value at a given pixel in the matrix is proportional to local density of wiggles in the seismic section with an added value of a previously calculated pixel.

Furthermore, in accordance with embodiments of the present invention, there is provided a computer program product stored on a non-transitory tangible computer readable storage medium for retrieving seismic data from a seismic section provided in a bitmap format. The computer program includes code for reconstructing a two dimensional matrix of seismic interpolated data in which a value at a given pixel in the matrix is proportional to local density of wiggles in the seismic section with an added value of a previously calculated pixel.

Furthermore, in accordance with embodiments of the present invention, there is provided a data processing system for retrieving seismic data from a seismic section provided in a bitmap format. The system includes a processor; a computer usable medium connected to processor. The computer usable medium contains a set of instructions for retrieving seismic data from a seismic section provided in a bitmap format wherein the processor is designed to carry out a set of instructions to reconstruct a two dimensional matrix of seismic interpolated data in which a value at a given pixel in the matrix is proportional to local density of wiggles in the seismic section with an added value of a previously calculated pixel.

BRIEF DESCRIPTION OF THE SEVERAL VIEWS THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Flowchart/s and block diagram/s in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

According to embodiments of the present invention it is proposed to employ image processing techniques, in which a bitmap image of the paper or image seismic data is converted into a grey-level image. This approach does not involve pattern recognition or any decision making, and does not necessitate locating base lines.

The description that follows below refers to performing reconstruction of seismic data according embodiments of the present invention on a seismic section which has wiggles showing both positive and negative values, but without blackened areas (blobs). Treatment of a blobbed seismic section is described further below.

Figure 12:
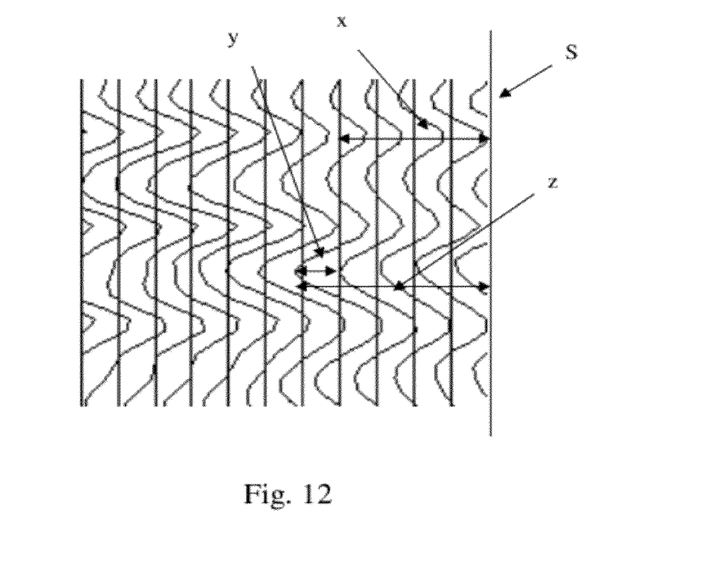
FIG. 12 is a portion of a seismic section, with visible base lines (typically not present in such plots) indicating considered parameters in a mathematical approach according to embodiments of the present invention.

Seismic sections are plot or display of seismic data along a line. The vertical direction usually refers to the arrival time (of echo) but sometimes relates to depth. Thus, two dimensional functions of x, the distance from a certain starting line S and of t, the time are considered, as depicted in FIG. 12 Seismic sections are also usually visually represented as wiggles, a bunch of one dimensional time functions along the vertical time dimension. Each wiggle swings about a typically invisible base-line. Base-lines, which have been made visible in FIG. 12, but which are usually invisible, represent zero amplitude of the wiggles which are actually functions of time t along a certain time-line x. Thus, wiggles are a conventional representation of the two dimensional function of y=f(x,t), where y is the distance of the curve from its base-line x.

A mathematical approach is hereinafter presented, according to embodiments of the present invention to reconstruct a two dimensional matrix of seismic data from the seismic section in bitmap format (22 and 24 in FIG. 13).

A two dimensional function z(x,t) defines the distance from a curve to the starting line S (see FIG. 12). Thus, equation (1) relates between those functions.

$$z = x + y \quad (1)$$

It is convenient to consider y(x,t) and z(x,t) as continuous functions of x and t, rather than as defined only for discrete values of x.

From (1) it follows that dy=dz−dx, where dx may be expressed in terms of dz.

According to embodiments of the present invention the seismic traces of the obtained seismic section (10 in FIG. 13) are approximated by a grey level image. A transformation may be used which translates the geometrical features of the traces into radiometric counterparts. For example, when considering densely clustered traces, bare eyes would not separate one trace from another; in this case one is expected to see a grey levels image instead. Those grey levels are roughly proportional to the distance between adjacent traces.

According to embodiments of the present invention a complementary grey scale parameter $\tilde{g}$ is defined as $\tilde{g}=1-g$, so that black corresponds to $\tilde{g}=1$, and white corresponds to $\tilde{g}=0$, where g is the standard grey scale (where black is assigned 0 and white is assigned 1). It can easily be verified that grey level scale is inversely proportional to the distance between adjacent traces.

To describe seismic traces mathematically one may use a comb function. First, a regular comb is defined that corresponds to the case where the signal is mute for every time t. Hence, y≡0, and the distance between adjacent traces is always equal to Δx.

$$Comb(x, \Delta x) \equiv \sum_{k=-\infty}^{\infty} A \cdot \delta(x - k\Delta x) \quad (2)$$

It is convenient to add to the definition of delta function an additional equality:

$$\int_{-b}^{a} \delta(x)\,dx = 1, \quad \int_{0}^{a} \delta(x)\,dx = 0.5, \quad \int_{-b}^{0} \delta(x)\,dx = 0.5 \quad (3)$$

For any a, b>0

Using this convention and applying a smoothing operator:

$$S_d(\psi(x)) \equiv \frac{1}{2d}\int_{x-d}^{x+d} \psi(x')\,dx' \quad (4)$$

to comb $$Comb(x, \Delta x) \equiv \sum_{k=-\infty}^{\infty} A \cdot \delta(x - k\Delta x) \quad (2)$$

produces for 2d=n·Δx, where n>0 is an integer, a uniform grey level $\tilde{g}_0$:

$$S_d(Comb(x, \Delta x)) \equiv \frac{A \cdot n}{n \cdot \Delta x} = \frac{A}{\Delta x} = \tilde{g}_0,$$

where $A \equiv \tilde{g}_0 \Delta x$, and since the smoothing operation aperture, 2d, spans always over n delta functions.

Next another train of delta functions is defined, this time not equidistant, to describe the actual trace picture, where the distance between traces may vary (along each line where t=constant). This means y should not be equal to zero (y≠0), the integration variable is z, as in (1.

$$Train(z) \equiv \sum_{k=-\infty}^{\infty} A \cdot \delta(z - z_k) \quad (5)$$

where $z_k = z(k \cdot \Delta x)$

Applying the smoothing operator $$S_d(\psi(x)) \equiv \frac{1}{2d}\int_{x-d}^{x+d} \psi(x')\,dx' \quad (4)$$

to Train(z) at z, where $2d = n \cdot \Delta z$, $$\Delta z = z(x + \Delta x) - z(x) \quad (6)$$

$$\tilde{g}(z) = S_d(\text{Train}(z)) =$$
$$= \frac{1}{2d} \int_{z-d}^{z+d} \text{Train}(z')\,dz' =$$
$$= \frac{\tilde{g}_0 \Delta x}{n \cdot \Delta z} \cdot m$$
$$= \frac{\tilde{g}_0 \Delta x}{\Delta z} \cdot \frac{m}{n}$$

Note that $\Delta z$ and hence the filter aperture $2d$ varies, changing for each $z$. This time one cannot expect that these are exactly n delta functions within the aperture, $2d$, of the smoothing operator, since the distances between successive delta functions are not equal. Therefore, within the smoothing operator aperture there can be m≠n delta functions. Although in average it can be expected that m and n are close to each other, one cannot reduce m and n as a common factor in $$\tilde{g}(z) = S_d(\text{Train}(z)) = \quad (6)$$
$$= \frac{1}{2d} \int_{z-d}^{z+d} \text{Train}(z')\,dz' =$$
$$= \frac{\tilde{g}_0 \Delta x}{n \cdot \Delta z} \cdot m$$
$$= \frac{\tilde{g}_0 \Delta x}{\Delta z} \cdot \frac{m}{n}.$$

Since $\Delta x$ and $\Delta z$ in $$\tilde{g}(z) = S_d(\text{Train}(z)) = \quad (6)$$
$$= \frac{1}{2d} \int_{z-d}^{z+d} \text{Train}(z')\,dz' =$$
$$= \frac{\tilde{g}_0 \Delta x}{n \cdot \Delta z} \cdot m$$
$$= \frac{\tilde{g}_0 \Delta x}{\Delta z} \cdot \frac{m}{n}$$

suggest a derivative it is convenient to choose n as small as possible. Setting $n=1$ and $2d=\Delta z$ provides that there is always one delta function, that is $m=1$. Therefore, the final result is $$\tilde{g}(z) = \frac{\tilde{g}_0 \cdot \Delta x}{\Delta z}. \quad (7)$$

Thus for infinitely small $\Delta x$, $\Delta z$ $$dx = \frac{\tilde{g}(z)}{\tilde{g}_0} dz \quad (8)$$

From equation (1). and the last result it follows that $$dy = dz - dx = \frac{\tilde{g}_0 - \tilde{g}(z)}{\tilde{g}_0} dz = \frac{\Delta \tilde{g}}{\tilde{g}_0} dz \quad (9)$$

where $\Delta \tilde{g} = \tilde{g}_0 - \tilde{g}$

Thus $$dy = \frac{\Delta \tilde{g}}{\tilde{g}_0} dz \quad (10)$$

Without derogating generality, the proportionality factor in $$dy = \frac{\Delta \tilde{g}}{\tilde{g}_0} dz \quad (10)$$

may be set so that the derivative of y is equal to $\Delta \tilde{g}$ as in $$dy = \Delta \tilde{g} \cdot dz \quad (11)$$

$$dy = \Delta \tilde{g} \cdot dz \quad (11)$$

Note, in $$dy = \Delta \tilde{g} \cdot dz \quad (11)$$

$\Delta \tilde{g} = \tilde{g}_0 - \tilde{g}(z)$ is a function of z, rather than of x. Therefore, a numeric integration according to $$dy = \Delta \tilde{g} \cdot dz \quad (11)$$

may be computed by a formula:

$$y(z_n) = \Delta \tilde{g} \cdot \Delta z + y(z_{n-1}) \quad (12)$$

where $z_n$, $z_{n-1}$ are arbitrary geometrical points on an horizontal axis, that are close one to another, and $\Delta \hat{g}(z)$ is computed between these points.

Moreover, a value $y(z_n)$ as computed by $$y(z_n) = \Delta \tilde{g} \cdot \Delta z + y(z_{n-1}) \quad (12)$$

refers to a signal not at point $z_n$, but at a point, $x = z_n - y(z_n)$. For simplicity it may be assumed, that the signal does not change much with the point of observation x, since geological structures are also supposed to change slowly in the horizontal direction, and it may be also assumed that y does not exceed a couple of $\Delta x$. Therefore, change between x and z introduces errors of second order on dx and one may use (12) instead of (13)

$$y(z_n) = \Delta \tilde{g} \cdot \Delta z + y(z_{n-1}) \quad (12)$$

$$y(x_n) = \Delta \tilde{g} \cdot \Delta x + y(x_{n-1}) \quad (13)$$

where $x_n$ is the location of the n-th base-line and $\Delta \tilde{g} = \Delta \tilde{g}(x)$ is the deviation of the image grey level from $\tilde{g}_0$ at a point x between $x_{n-1}$ and $x_n$.

There is a problem with numeric integration in $$y(z_n) = \Delta \tilde{g} \cdot \Delta z + y(z_{n-1}) \quad (12),$$

since it represents an IIR filter with a pole at $|z|=1$, where z is a complex variable of the z transform. Therefore, one way to cure the problem is to introduce an $\alpha < 1$ that multiplies the old value $y(x_{n-1})$:

$$y(x_n) = \Delta \tilde{g} \cdot \Delta x + \alpha \cdot y(x_{n-1}) \quad (14)$$

Otherwise the integration will amplify low frequency noises.

However, this coefficient, $\alpha$, should be very close to 1, so that previous values of y at $x_{n-1}$ will be (almost) summed up. If $\alpha$ is much smaller than 1, the IIR filter of $$y(x_n) = \Delta \tilde{g} \cdot \Delta x + \alpha \cdot y(x_{n-1}) \quad (14)$$

quickly "forgets" previous values $y(x_n)$, so that the integration will be inaccurate.

There are other, more efficient ways to cure the problem of low frequency noise.

First, some averaging along vertical axis, t, may help to decrease the noise amplitude, at least to leave only the noise components with low frequencies both in x and in t direction. Second, a trace signal used to be a band-limited, such that it does not contain too low and too high frequencies (in t direction). Therefore, using an appropriate band-pass filter eliminates low frequencies noise and allow $\alpha=1$.

A simple way to compute the grey level image corresponding to the binary wiggles image would involve using a uniform weight function $$\tilde{g}(z, t) = \frac{\Delta x}{2d} \sum_{i=\frac{(z-d)}{\Delta x}}^{i=\frac{(z+d)}{\Delta x}} bw_i \tag{15}$$

where bw is a black (1) or a white (0) pixel, and 2d is the averaging support.

Convolution $$\tilde{g}(z, t) = \frac{\Delta x}{2d} \sum_{i=\frac{(z-d)}{\Delta x}}^{i=\frac{(z+d)}{\Delta x}} bw_i \tag{15}$$

should preferably not be with a uniform kernel and may even be two dimensional. The kernel support should preferably be carefully chosen. In particular, while using convolution $$\tilde{g}(z, t) = \frac{\Delta x}{2d} \sum_{i=\frac{(z-d)}{\Delta x}}^{i=\frac{(z+d)}{\Delta x}} bw_i \tag{15}$$

it may be desired that $$\frac{2d}{\Delta x}$$

be an integer number, otherwise the grey level image may contain high frequency noise even in the case of y=0, where wiggles are exactly at a distance $\Delta x$ from each other. Thus, uniform kernel in $$\tilde{g}(z, t) = \frac{\Delta x}{2d} \sum_{i=\frac{(z-d)}{\Delta x}}^{i=\frac{(z+d)}{\Delta x}} bw_i \tag{15}$$

may be disadvantageous, since in general it introduces high frequency noise for each choice of the kernel support. More advantageous would be a convolution kernel that has larger weights at its center and whose weights gradually decrease to zero at the support ends. Since convolution with the uniform kernel may be easily implemented, it is used as a standard convolution. Applying a convolution $$\tilde{g}(z, t) = \frac{\Delta x}{2d} \sum_{i=\frac{(z-d)}{\Delta x}}^{i=\frac{(z+d)}{\Delta x}} bw_i \tag{15}$$

with $2d=\Delta x$ twice in series one gets a triangular kernel with width $2\Delta x$. The next step is to revise an approximate equation $$y(x_n)=y(x_{n-1})+Av(x_{n-1},x_n,\Delta\tilde{g})\cdot\Delta x \tag{16}$$

where Av is an averaging functional:

$$Av(x_{n-1}, x_n, u(x)) = \frac{1}{\Delta x}\int_{x_{n-1}}^{x_n} u(x')\,dx' \tag{17}$$

Note that the value that the averaging functional $$Av(x_{n-1}, x_n, u(x)) = \frac{1}{\Delta x}\int_{x_{n-1}}^{x_n} u(x')\,dx' \tag{17}$$

produces coincides with the value of yet another convolution with the uniform kernel at the point $$\frac{x_{n-1} + x_n}{2}.$$

Therefore, if the grey level image is obtained with a double convolution (i.e. triangular kernel), then in order to perform integration $$y(x_n)=y(x_{n-1})+Av(x_{n-1},x_n,\Delta\tilde{g})\cdot\Delta x \tag{16}$$

one has to convolve the grey level once more with uniform kernel and pick a value of convolution at a point $$\frac{x_{n-1} + x_n}{2}.$$

In other words, one can compute the grey level image with 3 sequential convolutions with uniform kernel. The resulting kernel looks like an inverted parabola at its peak and as a straight parabola at its tails.

Note, that a computation according to equation $$y(x_n)=y(x_{n-1})+Av(x_{n-1},x_n,\Delta\tilde{g})\cdot\Delta x \tag{16}$$

is still approximation to the real signal, since a smoothing of the binary trace image is not uniquely defined operation, as it depends on the form of the smoothing kernel and the size of its support.

Thus, using the mathematical approach described hereinabove one may obtain a two-dimensional matrix of retrieved and interpolated seismic data from a seismic section provided in bitmap form (e.g. scanned from paper). This matrix is in fact a grey-scale image of the retrieved seismic data.

The mathematical approach described above assumed that the seismic section only included wiggles.

However typically seismic sections may also include time lines and blobs. Therefore, in order to retrieve seismic data from such seismic sections the time lines and blobs should be addressed too.

Figure 3:
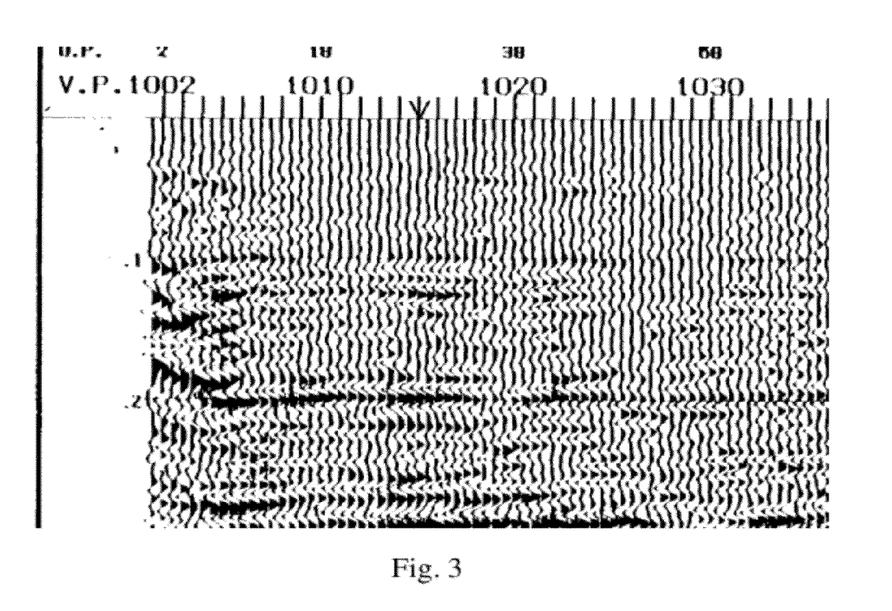
FIG. 3 shows the seismic section of FIG. 1, after the time lines had been removed, according to embodiments of the present invention.

According to embodiments of the present invention it is therefore suggested to disregard the time lines. This may be achieved, for example, by removing the time lines (14, 12 in FIG. 13) from the seismic section for example, by employing morphological processing which remove the time lines form the scanned seismic section, but may also be achieved in alternative ways. FIG. 3 shows the seismic section of FIG. 1, after the time lines had been removed, according to embodiments of the present invention.

When considering a seismic section with blobbed parts (16 in FIG. 13)—typically the positive sides of the wiggles, but may also be the negative sides of the wiggles—one may treat the blobbed sides separately from the non-blobbed sides of the wiggles.

According to embodiments of the present invention, it is suggested to regard the blobs separately by isolating the blobs from the seismic section. For example, this can be done in morphological processing.

Figure 2:
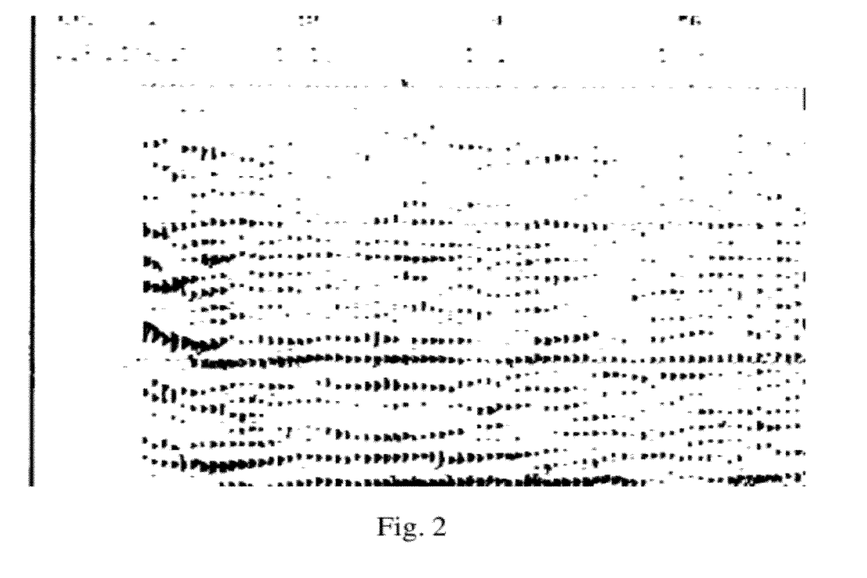
FIG. 2 shows isolated blobs of the seismic section of FIG. 1, after the seismic trace was subjected to morphological processing in which wiggles and time lines were removed, according to embodiments of the present invention.

FIG. 2 shows isolated blobs of the seismic section of FIG. 1, after the seismic section had been subjected to morphological processing in which wiggles and time lines were removed, according to embodiments of the present invention.

Figure 13:
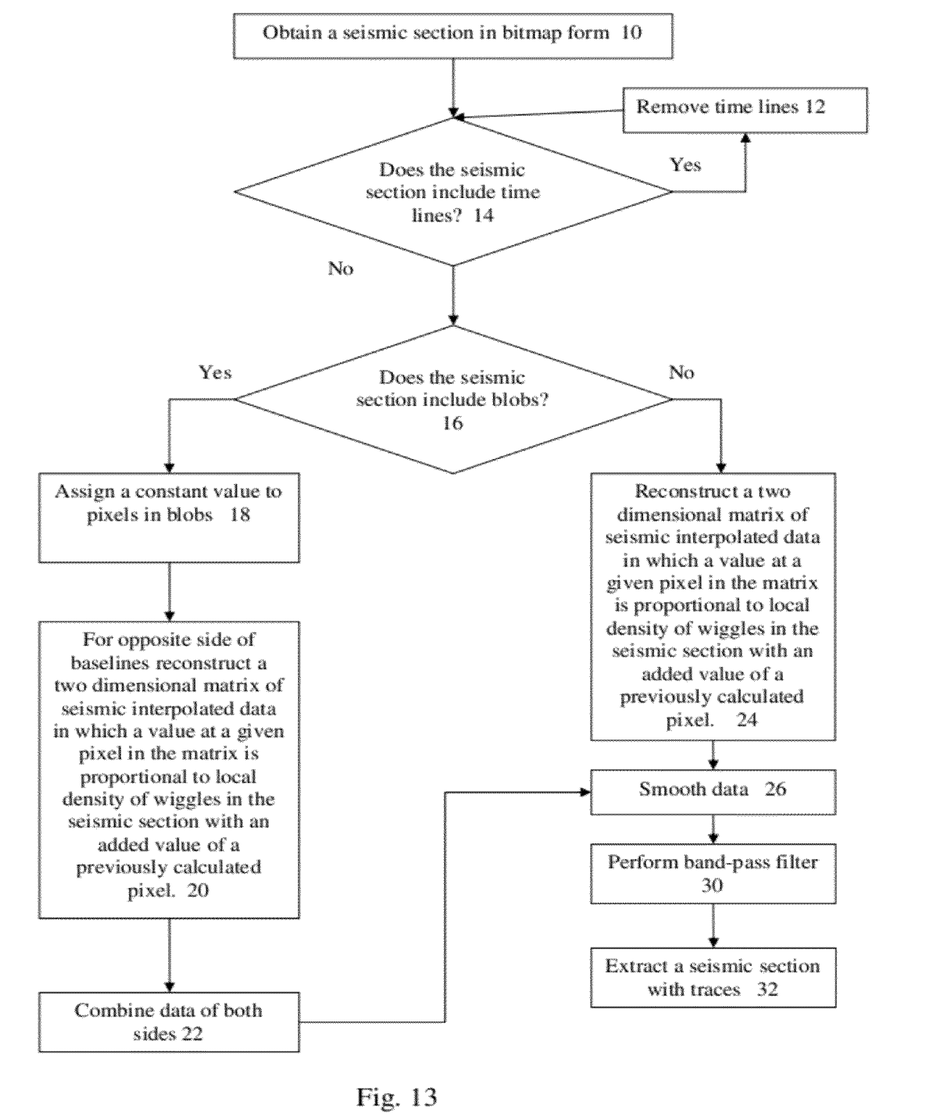
FIG. 13 is a flow chart of a method for retrieving seismic data from a seismic section, according to embodiments of the present invention.

After isolating the blobs pixel values of the entire image of isolated blobs are saved in a two-dimensional matrix where a first constant value (e.g. 0.5) is assigned to pixels located in blobs (18 in FIG. 13).

Figure 4:
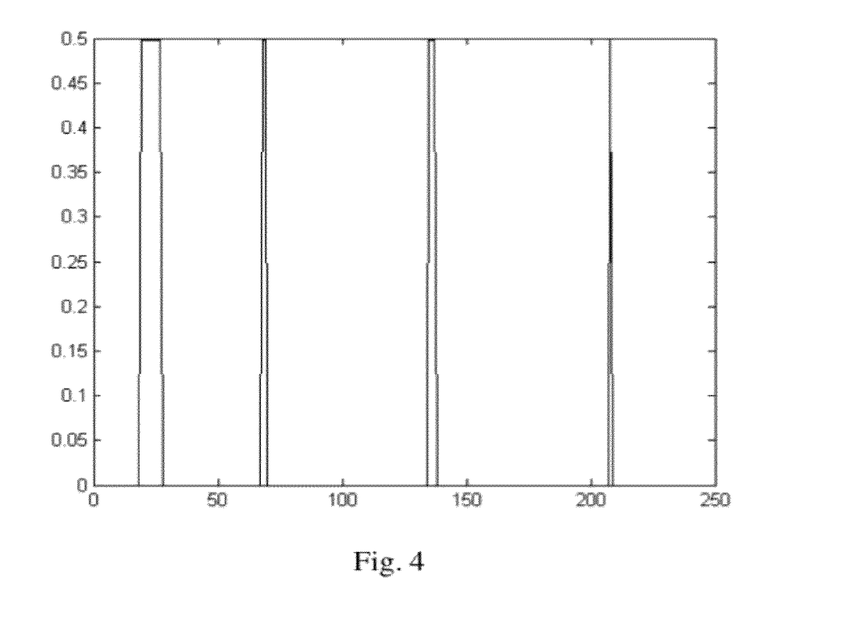
FIG. 4 is a plot of the positive values of a trace of the seismic section of FIG. 1, according to embodiments of the present invention.

FIG. 4 is a plot of the positive values of a trace (vertical line) of the seismic section of FIG. 1, according to embodiments of the present invention, retrieved from an image with isolated blobs. It should be mentioned that as scans of seismic data may include artifacts attributed to noise, dirt or other accidental factors that may affect the scan, artifact removal techniques may be used to enhance the final results. For example, one may employ morphological processing such as "salt and pepper" removal (black artifact pixels in white areas and white artifact pixels in blob zones). Other artifact removal techniques may be employed too.

Figure 5:
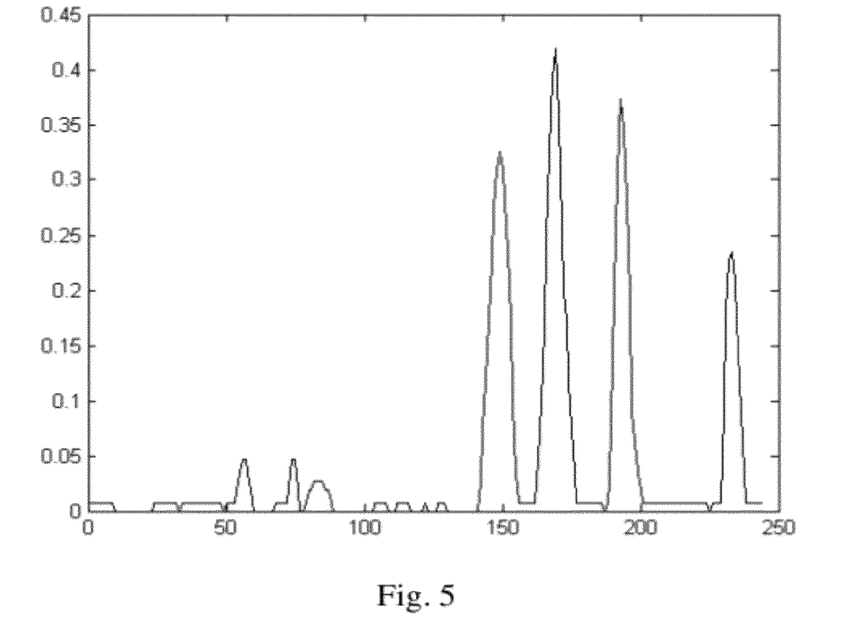
FIG. 5 is a plot of the negative values of the trace of the seismic section whose corresponding positive values are plotted in FIG. 4, according to embodiments of the present invention.

FIG. 5 is a plot of the negative values of the trace of the seismic section whose corresponding positive values are plotted in FIG. 4, according to embodiments of the present invention. These values represent the values derived in the mathematical approach described hereinabove, according to embodiments of the present invention (20 in FIG. 13).

Figure 6:
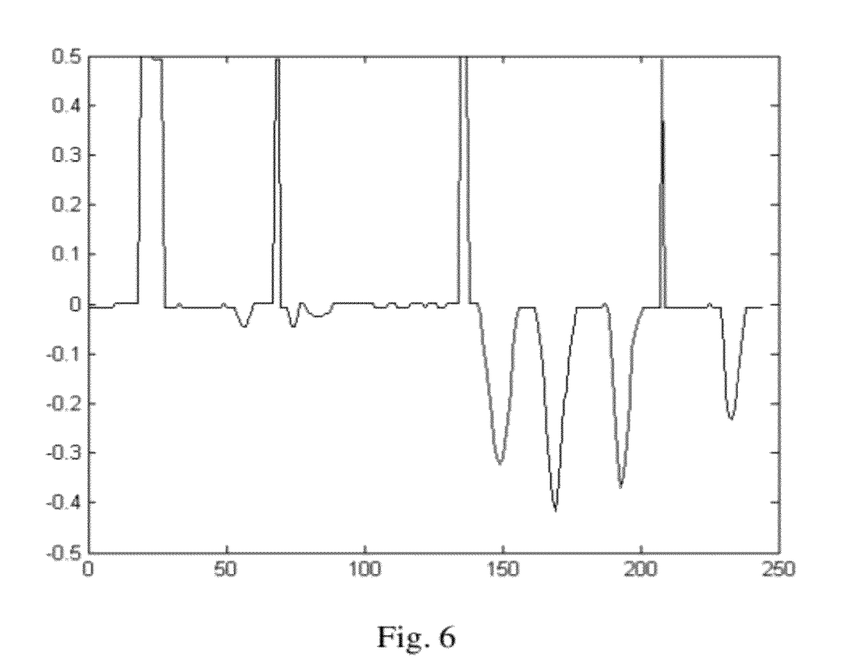
FIG. 6 is a plot of the combined negative and positive values of the trace (of FIG. 4 and FIG. 5), according to embodiments of the present invention.

FIG. 6 is a plot of the combined negative and positive values of the trace (of FIG. 4 and FIG. 5, and see 22 in FIG. 13), according to embodiments of the present invention.

Figure 7:
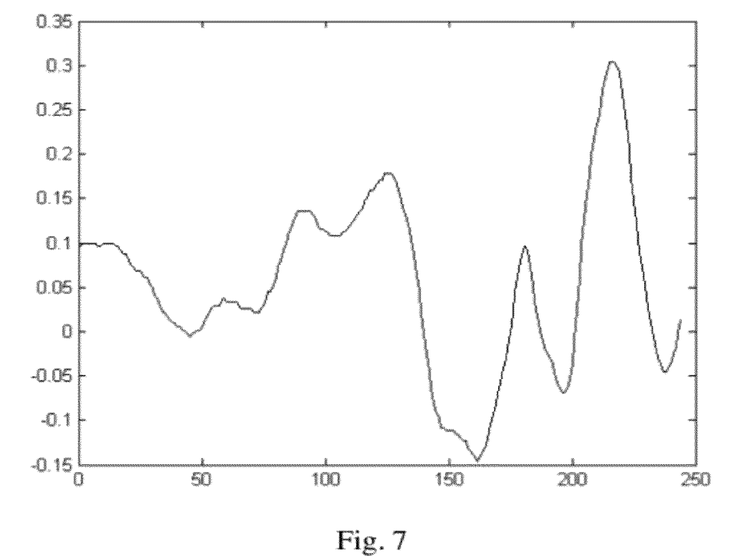
FIG. 7 is a plot of the trace plotted in FIG. 6 after performing smoothing, according to embodiments of the present invention.

FIG. 7 is a plot of the trace plotted in FIG. 6 after performing smoothing, according to embodiments of the present invention. Smoothing (26 in FIG. 13) may be useful in order to limit the bandwidth of the retrieved signal, as, in fact, the positive sides of the trace the blobbed areas were assigned the value of 1, whereas in the negative sides actual values were retrieved. Smoothing is performed across the entire two-dimensional matrix.

A band pass filter may also be performed on the data (30 in FIG. 13), in a one-dimensional manner (along the time coordinate axis).

Figure 8:
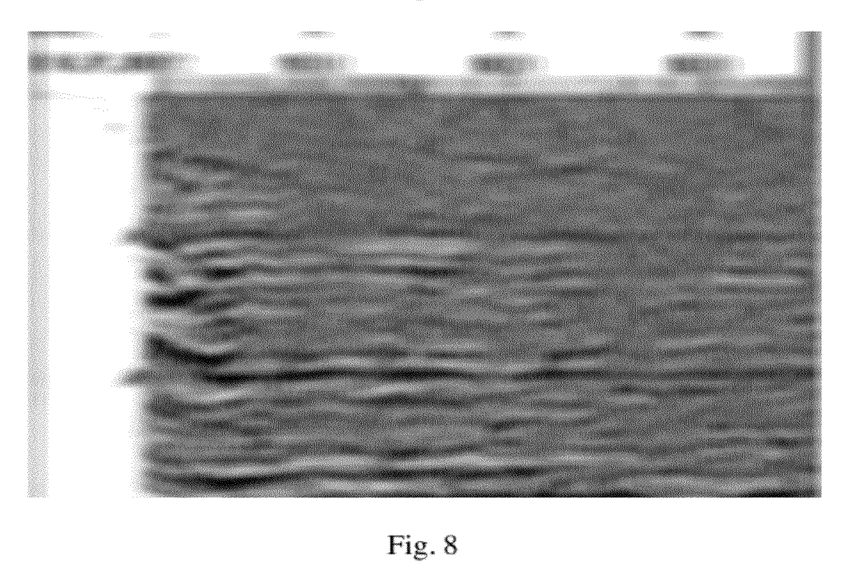
FIG. 8 illustrates a grey-level image representing a two-dimensional matrix of recovered and interpolated seismic data corresponding to the seismic section of FIG. 1, according to embodiments of the present invention.

FIG. 8 illustrates a grey-level image representing a two-dimensional matrix of retrieved and interpolated seismic data corresponding to the seismic section of FIG. 1, according to embodiments of the present invention. In compliance with the sampling theorem (also known as the Nyquist-Shannon theorem), as the retrieved signal is band-limited, it is possible to reconstruct the entire field of the seismic section and obtain seismic values at any given pixel in that field, and thus all seismic values of the two-dimensional matrix forming the grey-level image shown may be interpolated.

Figure 9:
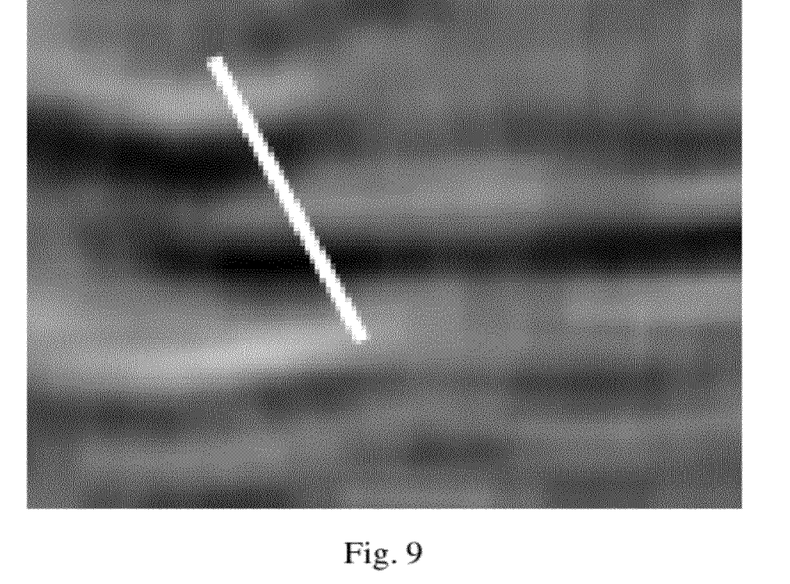
FIG. 9 shows a straight line drawn across a grey level image derived by performing a method for recovering seismic data from a seismic section according to embodiments of the present invention.

FIG. 9 shows a straight line drawn across a grey level image derived by performing a method for retrieving seismic data from a seismic section according to embodiments of the present invention.

Once the entire seismic data field has been retrieved it is possible to retrieve seismic profiles at any given direction in the two-dimensional field.

Figure 10:
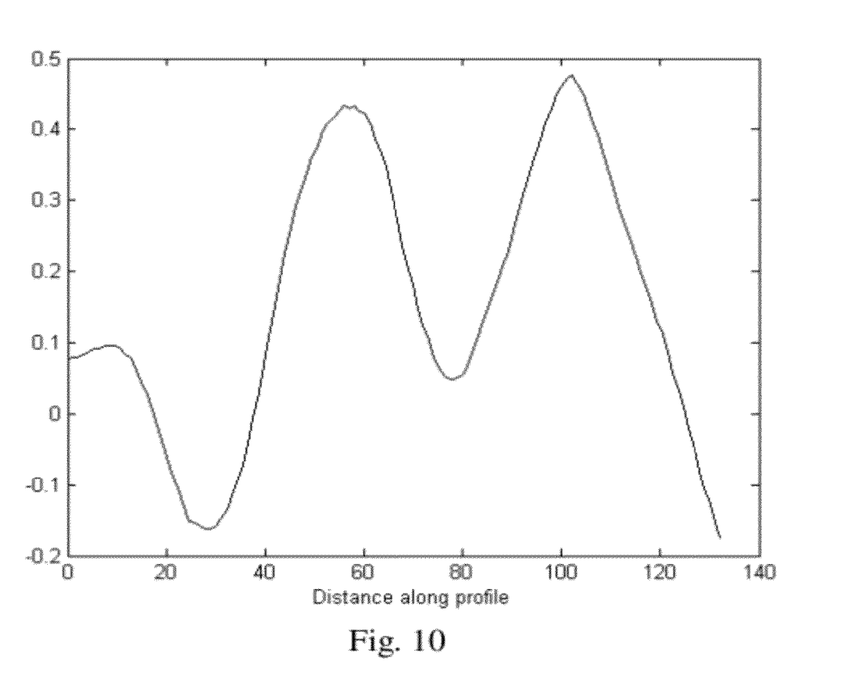
FIG. 10 is a plot of the seismic values present along the line shown in FIG. 9.

FIG. 10 is a plot of the seismic values present along the line shown in FIG. 9. This is the seismic profile along that line.

Figure 11:
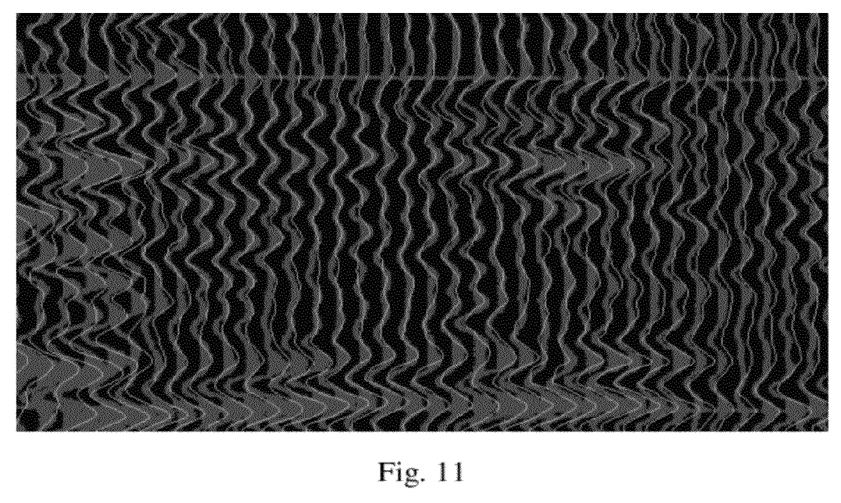
FIG. 11 shows a recovered seismic section in which only wiggles appear, which was extracted from and superimposed on a corresponding original seismic section (shown in grey for enhanced viewing), according to embodiments of the present invention.

FIG. 11 shows an extracted seismic section in which only wiggles appear, which was extracted (32 in FIG. 13) from and superimposed on a corresponding original seismic section (shown in grey for enhanced viewing), according to embodiments of the present invention. Since the original traces in the original seismic section represent signals received by physical receivers whose locations are known it may desired, when reconstructing the seismic section, to present traces which correspond to the actual traces found in the original scanned seismic section. However, any other way of trace presentation may be derived form the two-dimensional matrix of reconstructed seismic data.

The fact that the two-dimensional matrix of reconstructed seismic data covers the entire field makes it possible to retrieve traces in any desired manner.

For example, it may happen that the scanned seismic section was not properly aligned and is therefore tilted. If this is determined the recovered seismic section may present traces along tilted lines in the recovered field.

The scanned image of the seismic section may be distorted, for example, due to non-parallel feeding of the paper on which the seismic section is provided into the scanner. In such a case and upon determining the distortion, the recovered seismic section may include traces which represent profiles along distorted lines whose distortion corresponds to the determined distortion of the scan.

Figure 14:
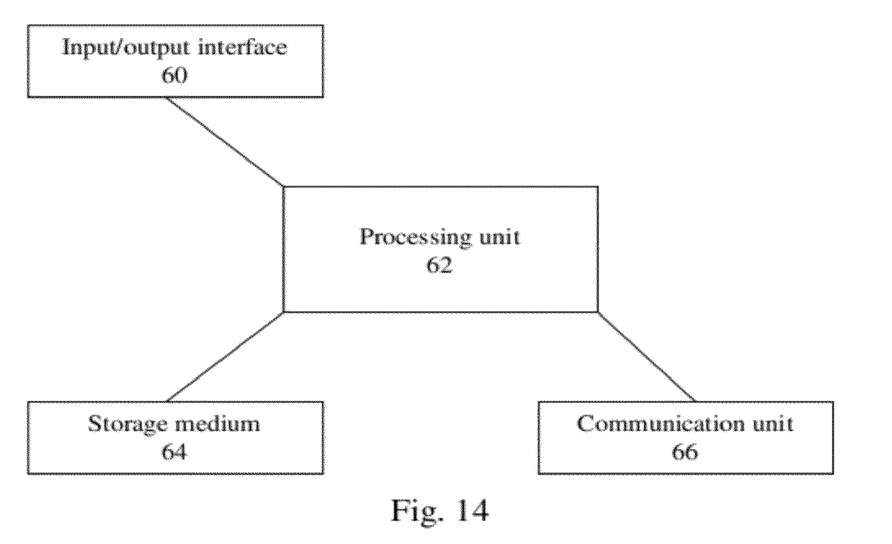
FIG. 14 illustrates a computerized system for retrieving seismic data from a seismic section according to embodiments of the present invention.

FIG. 14 illustrates a computerized system for recovering a seismic section according to embodiments of the present invention. The system, such as, for example, a computer device, may include an input/output unit 60, which may include, for example, a keyboard, a pointing device, a touch screen, a printer and a monitor. The system also includes processing unit 62, which may include a single processor or a plurality of processors, storage medium 64, which may include, for example, a hard-disk, flash memory, floppy disk, disk-on-key, on which a computer executable program may be stored, which includes instructions to perform a method according to embodiments of the present invention. A communication unit 66 may be provided for communicating with another system across a communication line or a network over communication wire or wires or wirelessly.

What is claimed is:

1. A method comprising:
    obtaining a seismic section image in a bitmap format, wherein the seismic section is a two dimensional surface exhibiting a plurality of traces representing seismic data drawn along base lines, wherein the base lines are indicative of at least one of: time, and depth; and
    reconstructing a two dimensional seismic matrix of pixels, based on the seismic section image, wherein each one of the pixels at the two dimensional seismic matrix is associated with a value proportional to a distance between adjacent traces on the seismic section along the base lines.

2. A computer implemented method as claimed in claim 1, further comprising removing time lines from the seismic section image, wherein the bitmap format is a binary image.

3. A computer implemented method as claimed in claim 1, further comprising assigning a constant value to pixels at the two dimensional seismic matrix of pixels which form a blob in the seismic section image.

4. A computer implemented method as claimed in claim 3, further comprising combining the pixels assigned with the constant values with reconstructed two dimensional matrix.

5. A computer method as claimed in claim 1, further comprising smoothing the seismic data of the two dimensional matrix.

6. A computer implemented method as claimed in claim 1, further comprising extracting a seismic section that includes traces.

7. A computer method as claimed in claim 1, further comprising producing a grey-level image from the two-dimensional matrix.

8. A computer program product comprising:
   a non transitory computer readable medium having computer readable program embodied therewith, the computer readable program comprising:
   computer readable program configured to obtain a seismic section image in a bitmap format, wherein the seismic section is a two dimensional surface exhibiting a plurality of traces representing seismic data drawn along base lines, wherein the base lines are indicative of at least one of: time, and depth; and
   computer readable program configured to reconstruct a two dimensional seismic matrix of pixels, based on the seismic section image, wherein each one of the pixels at the two dimensional seismic matrix is associated with a value proportional to a distance between adjacent traces on the seismic section along the base lines.

9. A computer program product as claimed in claim 8, wherein the computer program further includes code for removing time lines from the seismic section image, wherein the bitmap format is a binary image.

10. A computer program product as claimed in claim 8, wherein the computer program includes code for assigning a constant value to pixels which form a blob in the seismic section image.

11. A computer program product as claimed in claim 10, wherein the computer program further includes code for combining the pixels assigned with the constant values with the reconstructed two dimensional matrix.

12. A computer program product as claimed in claim 8, wherein the computer program includes code for smoothing the seismic data of the two dimensional matrix.

13. A computer program product as claimed in claim 8, wherein the computer program includes code for extracting a seismic section that includes traces.

14. A computer program product as claimed in claim 8, wherein the computer program includes code for producing a grey-level image from the two-dimensional matrix.

15. A system comprising:
   a memory configured to store a seismic section image in a bitmap format, wherein the seismic section is a two dimensional surface exhibiting a plurality of traces representing seismic data drawn along base lines, wherein the base lines are indicative of at least one of: time, and depth; and
   a computer processor configured to execute a set of instructions for reconstructing a two dimensional seismic matrix of pixels, based on the seismic section image, wherein each one of the pixels at the two dimensional seismic matrix is associated with a value proportional to a distance between adjacent traces on the seismic section along the base lines.

16. A data processing system as claimed in claim 15, wherein the set of the instructions include instructions to remove time lines from the seismic section image.

17. A data processing system as claimed in claim 16, wherein the set of the instructions include instructions to assign a constant value to the pixels which form a blob in the bitmap.

18. A data processing system as claimed in claim 17, wherein the set of the instructions include instructions to combine the pixels assigned with the constant values with reconstructed two dimensional matrix.

19. A data processing system as claimed in claim 16, wherein the set of the instructions include instructions to smooth the seismic data of the two dimensional matrix.

20. A data processing system as claimed in claim 16, wherein the set of the instructions include instructions to extract a seismic section that includes traces.

21. A data processing system as claimed in claim 16, wherein the set of the instructions include instructions to produce a grey-level image from the two-dimensional matrix.

* * * * *